(12) United States Patent
Nibarger et al.

(10) Patent No.: US 7,453,671 B1
(45) Date of Patent: Nov. 18, 2008

(54) MAGNETIC HEAD HAVING A PAIR OF MAGNETO-RESISTIVE (MR) READERS OF THE SAME TYPE WITH EACH READER BEING TUNED DIFFERENTLY

(75) Inventors: John P. Nibarger, Superior, CO (US); Francis X. Campos, Louisville, CO (US)

(73) Assignee: Stoarge Technology Corporation, Louisville, CO (US)

( * ) Notice: Subject to any disclaimer, the term of this patent is extended or adjusted under 35 U.S.C. 154(b) by 465 days.

(21) Appl. No.: 11/262,700

(22) Filed: Oct. 31, 2005

(51) Int. Cl.
*G11B 5/39* (2006.01)
*G11B 5/265* (2006.01)

(52) U.S. Cl. .................................. 360/316; 360/317
(58) Field of Classification Search ............. 360/313, 360/314, 315, 316, 317
See application file for complete search history.

(56) References Cited

U.S. PATENT DOCUMENTS

| | | | | |
|---|---|---|---|---|
| 4,757,410 | A | * | 7/1988 | Seko et al. .................. 360/316 |
| 5,335,127 | A | * | 8/1994 | Nagata et al. ............... 360/316 |
| 5,920,446 | A | | 7/1999 | Gill |
| 5,995,337 | A | * | 11/1999 | Kira ........................... 360/316 |
| 6,104,562 | A | * | 8/2000 | Ottesen et al. ................ 360/63 |
| 6,317,289 | B1 | | 11/2001 | Sasaki |
| 6,532,130 | B1 | * | 3/2003 | Murari et al. ............ 360/77.06 |
| 6,583,971 | B1 | | 6/2003 | Shen et al. |
| 6,606,216 | B1 | * | 8/2003 | Liikanen et al. .......... 360/77.08 |
| 6,826,020 | B2 | * | 11/2004 | Daby et al. .................. 360/317 |
| 6,914,756 | B2 | * | 7/2005 | Molstad et al. ............. 360/316 |
| 7,193,812 | B2 | * | 3/2007 | Eaton ......................... 360/121 |
| 7,382,585 | B1 | * | 6/2008 | Nibarger et al. ............. 360/316 |
| 2001/0029051 | A1 | | 10/2001 | Hyodo et al. |
| 2003/0076635 | A1 | | 4/2003 | Morinaga et al. |
| 2003/0103300 | A1 | | 6/2003 | Shen et al. |
| 2003/0151855 | A1 | * | 8/2003 | Molstad et al. ............. 360/316 |
| 2003/0202294 | A1 | | 10/2003 | Terunuma |

FOREIGN PATENT DOCUMENTS

| | | | |
|---|---|---|---|
| EP | 519674 A2 | * | 12/1992 |
| JP | 04370511 A | * | 12/1992 |
| JP | 10302203 A | * | 11/1998 |
| JP | 2001101615 A | * | 4/2001 |
| JP | 2003346331 A | * | 12/2003 |

* cited by examiner

*Primary Examiner*—William J Klimowicz
(74) *Attorney, Agent, or Firm*—James Kallis

(57) ABSTRACT

A magnetic head comprising for reading data from magnetic media includes a first magneto-resistive (MR) reader and a second MR reader. Both of the MR readers are either anisotropic magneto-resistive (AMR) readers or giant magneto-resistive (GMR) readers. The MR readers are tuned to sense magnetic flux differently such that the magnetic head is capable of reading two different types of magnetic media. The magnetic head may be configured such that the readers share sensor shields in various configurations in order to carry out their reading functions. The magnetic head may further include a writer. In this case, the magnetic head may be configured such that the writer and the readers share sensor shields in various configurations in order to carry out their writing and reading functions.

17 Claims, 3 Drawing Sheets

MAGNETIC HEAD HAVING A PAIR OF MAGNETO-RESISTIVE (MR) READERS OF THE SAME TYPE WITH EACH READER BEING TUNED DIFFERENTLY

BACKGROUND OF THE INVENTION

1. Field of the Invention

The present invention relates to a magnetic head having a pair of magneto-resistive (MR) readers.

2. Background Art

A magnetic writer generates magnetic flux to record magnetic transitions into magnetic media in order to write data onto the media. A magnetic reader measures the amount of magnetic flux emanating from a magnetization transition in which data is encoded on magnetic media in order to read the data. Some magnetic readers use a thin-film magneto-resistive (MR) sensor to convert the varying magnetic flux emanating from magnetic media to a varying voltage signal.

SUMMARY OF THE INVENTION

The amount of magnetic flux that emanates from a magnetization transition in magnetic media is $2M_r^{media}\delta_{media}$, where $M_r^{media}$ is the remanent magnetization of the media, $\delta_{media}$ is the thickness of the magnetic portion of the media, and the factor of "2" accounts for the magnetic flux which emanates from both sides of the magnetization transition. An MR sensor senses a given amount of magnetic flux ($M_r^{sensor}\delta_{sensor}$) before saturating. An efficiency factor $\epsilon$ gives the efficiency in which an MR sensor senses magnetic flux. Thus, the actual amount of magnetic flux an MR sensor senses from a magnetic media with an $M_r^{media}\delta_{media}$ is $\frac{1}{2}\epsilon M_r^{sensor}\delta_{sensor}$. Accordingly, an MR sensor is tunable to a given magnetic media by changing any of the efficiency, the remanent magnetization of the media, and the magnetic thickness of the media.

The efficiency in which an MR sensor senses magnetic flux can be varied using various techniques, the first of which is the type of MR sensor used. Anisotropic magneto-resistive (AMR) sensors and giant magneto-resistive (GMR) sensors are currently being used and envisioned for flexible magnetic media applications. These two MR sensor types rely on different physical processes for generating a varying voltage signal from the varying magnetic flux of the magnetic media and have correspondingly different sensitivities.

AMR is based on a bulk effect so that a decrease in the magnetic thickness of magnetic media effects not only the amount of magnetic flux that an AMR sensor can receive ($M_r^{sensor}\delta_{sensor}$), but also increases the interfacial scattering and decreases the overall output. The most commonly used AMR material is $Ni_{80}Fe_{20}$. The sensor portion of an AMR sensor is the bulk $Ni_{80}Fe_{20}$ layer and can be referred to as the free layer of the AMR sensor. This is due to its ability to freely move in the presence of an external magnetic field.

GMR is based on an interface effect. A GMR sensor is a stack of magnetic materials which include a pinned layer, a non-magnetic spacer layer, and a free layer. The pinned layer is often a stack of materials that include an anti-ferromagnet coupled to a ferromagnet. Typical anti-ferromagnets include Mn based alloys and typical ferromagnets include CoFe and CoFeB alloys. This ferromagnet is considered pinned because a significant field is required to change its magnetization direction. This pinned ferromagnet can also be constructed as a synthetic anti-ferromagnet (SAF). A SAF includes two ferromagnetic materials separated by a thin non-magnetic material (usually Ru) which allows for strong anti-ferromagnetic coupling between the two ferromagnets. The non-magnetic spacer layer is typically either a Cu or Cu based alloy. The free layer typically includes either a CoFe/NiFe or CoFeB/NiFe bilayer. The free layer can be made into a synthetic ferrimagnet through the insertion of a thin non-magnetic material (usually Ru) which allows for strong anti-ferromagnetic coupling between the two ferromagnetic layers in the free layer. The actively rotating magnetic moment consists solely of the free layer. As a result, a GMR sensor can be made with very thin magnetic thickness in its free layer.

There are other ways to vary the efficiency in which AMR and GMR sensors sense magnetic flux. For instance, any of the following can be changed to vary the efficiency of either type of MR sensor: the placement of the MR sensor in the gap between the shields, the amount of exchange coupling between the active free layer and either a ferromagnet or anti-ferromagnet, the bias current, the size of the gap between the shields, an external fixed field, the strength of the permanent magnets, the depth and frequency of a grating stabilizer, and the anisotropy of the MR sensor. Another way to vary the efficiency of either type of MR sensor is to use a paired sensor design. Varying the anisotropy of either type of MR sensor can be accomplished through material as well as geometric means. For an AMR sensor, a barber pole design can be used, the canting of the easy axis can be varied, and the strength of the biasing soft adjacent layer can be varied. For a GMR sensor, the canting of the pinned direction can be varied and the sensor type can be changed from a synthetic anti-ferromagnet pinned layer to either a simple pinned layer or a dual pinned layer.

The materials used and their thicknesses also varies the amount of magnetic flux that an MR sensor accepts ($\frac{1}{2}\epsilon M_r^{sensor}\delta_{sensor}$). The magnetic thickness is a main factor, but the $M_r^{sensor}$ can be changed as well. For instance, in a GMR sensor, the free layer can be an alloy of $Co_{90}Fe_{10}$ and $Ni_{80}Fe_{20}$ in varying ratios. The $M_r$ of CoFe is ~1.5 times that of NiFe and therefore the $M_r$ can be varied accordingly. The magnetic thickness can be made arbitrarily small in a GMR sensor by using the aforementioned synthetic ferromagnet free layer.

Accordingly, it is an object of the present invention to provide a magnetic head having a pair of MR readers of the same type which are tuned to sense magnetic flux differently such that the magnetic head is capable of reading two different types of magnetic media.

It is another object of the present invention to provide a magnetic head having a pair of AMR readers which are tuned to sense magnetic flux differently such that the magnetic head is capable of reading two different types of magnetic media.

It is a further object of the present invention to provide a magnetic head having a pair of GMR readers which are tuned to sense magnetic flux differently such that the magnetic head is capable of reading two different types of magnetic media.

It is another object of the present invention to provide a magnetic head having a writer and a pair of MR readers of the same type in which the MR readers are tuned to sense magnetic flux differently such that the magnetic head is capable of reading two different types of magnetic media.

It is a further object of the present invention to provide a magnetic head having a pair of MR readers of the same type in which the MR readers are supported by a substrate in a stacked fashion and the MR readers are tuned to sense magnetic flux differently such that the magnetic head is capable of reading two different types of magnetic media.

It is another object of the present invention to provide a magnetic head having a writer and a pair of MR readers of the same type in which the writer and the MR readers are supported by a substrate in a stacked fashion with the writer being stacked between the MR readers and in which the MR readers are tuned to sense magnetic flux differently such that the magnetic head is capable of reading two different types of magnetic media.

It is a further object of the present invention to provide a magnetic head having a writer and a pair of MR readers of the same type in which the writer and the MR readers are supported by a substrate in a stacked fashion with the MR readers being stacked upon one another and in which the MR readers are tuned to sense magnetic flux differently such that the magnetic head is capable of reading two different types of magnetic media.

In carrying out the above objects and other objects, the present invention provides a magnetic head having first and second magneto-resistive (MR) readers in which both of the readers are either anisotropic magneto-resistive (AMR) readers or giant magneto-resistive (GMR) readers and the readers are tuned to sense magnetic flux differently such that the magnetic head is capable of reading two different types of magnetic media. In certain embodiments, as described below, the magnetic head further includes a writer.

In a first embodiment of the magnetic head, both of the readers are AMR readers which are tuned to sense magnetic flux differently such that the magnetic head is capable of reading two different types of magnetic media and the magnetic head further includes a writer. The first AMR reader includes an AMR sensor sandwiched between an AMR sensor bottom shield and a shared shield. The shared shield serves as an AMR sensor top shield for the AMR sensor of the first AMR reader. The writer includes a write gap layer on the shared shield and includes a top pole on the write gap layer. The shared shield serves as a bottom pole for the writer. The second AMR reader includes an AMR sensor sandwiched between an AMR sensor bottom shield and an AMR sensor top shield. An insulating gap layer separates the AMR sensor bottom shield of the second AMR reader from the top pole of the writer.

In a second embodiment of the magnetic head, both of the readers are AMR readers which are tuned to sense magnetic flux differently such that the magnetic head is capable of reading two different types of magnetic media and the magnetic head further includes a writer. The first AMR reader includes an AMR sensor sandwiched between an AMR sensor bottom shield and a shared shield. The shared shield includes a main body portion and a pedestal portion. The main body portion serves as an AMR sensor top shield for the AMR sensor of the first AMR reader. The writer includes a write gap layer on the pedestal portion and includes a top pole on the write gap layer. The pedestal portion serves as a bottom pole for the writer. The second AMR reader includes an AMR sensor sandwiched between an AMR sensor bottom shield and an AMR sensor top shield. An insulating gap layer separates the AMR sensor bottom shield of the second AMR reader from the top pole of the writer.

In a third embodiment of the magnetic head, both of the readers are AMR readers which are tuned to sense magnetic flux differently such that the magnetic head is capable of reading two different types of magnetic media and the magnetic head further includes a writer. The first AMR reader includes an AMR sensor sandwiched between an AMR sensor bottom shield and a shared AMR/AMR sensor shield. The shared AMR/AMR sensor shield serves as an AMR sensor top shield for the AMR sensor of the first AMR reader. The second AMR reader includes an AMR sensor sandwiched between the shared AMR/AMR sensor shield and a shared shield. The shared AMR/AMR sensor shield serves as an AMR sensor bottom shield for the AMR sensor of the second AMR reader and the shared shield serves as an AMR sensor top shield for the AMR sensor of the second AMR reader. The writer includes a write gap layer on the shared shield and includes a top pole on the write gap layer. The shared shield serves as a bottom pole for the writer.

In a fourth embodiment of the magnetic head, both of the readers are AMR readers which are tuned to sense magnetic flux differently such that the magnetic head is capable of reading two different types of magnetic media and the magnetic head further includes a writer. The first AMR reader includes an AMR sensor sandwiched between an AMR sensor bottom shield and a shared AMR/AMR sensor shield. The shared AMR/AMR sensor shield serves as an AMR sensor top shield for the AMR sensor of the first AMR reader. The second AMR reader includes an AMR sensor sandwiched between the shared AMR/AMR sensor shield and a shared shield. The shared AMR/AMR sensor shield serves as an AMR sensor bottom shield for the AMR sensor of the second AMR reader. The shared shield includes a main body portion and a pedestal portion. The main body portion serves as an AMR sensor top shield for the AMR sensor of the second AMR reader. The writer includes a write gap layer on the pedestal portion and includes a top pole on the write gap layer. The pedestal portion serves as a bottom pole for the writer.

In a fifth embodiment of the magnetic head, both of the readers are GMR readers which are tuned to sense magnetic flux differently such that the magnetic head is capable of reading two different types of magnetic media and the magnetic head further includes a writer. The first GMR reader includes a GMR sensor sandwiched between a GMR sensor bottom shield and a shared shield. The shared shield serves as a GMR sensor top shield for the GMR sensor of the first GMR reader. The writer includes a write gap layer on the shared shield and includes a top pole on the write gap layer. The shared shield serves as a bottom pole for the writer. The second GMR reader includes a GMR sensor sandwiched between a GMR sensor bottom shield and a GMR sensor top shield. An insulating gap layer separates the GMR sensor bottom shield of the second GMR reader from the top pole of the writer.

In a sixth embodiment of the magnetic head, both of the readers are GMR readers which are tuned to sense magnetic flux differently such that the magnetic head is capable of reading two different types of magnetic media and the magnetic head further includes a writer. The first GMR reader includes a GMR sensor sandwiched between a GMR sensor bottom shield and a shared shield. The shared shield includes a main body portion and a pedestal portion. The main body portion serves as a GMR sensor top shield for the GMR sensor of the first GMR reader. The writer includes a write gap layer on the pedestal portion and includes a top pole on the write gap layer. The pedestal portion serves as a bottom pole for the writer. The second GMR reader includes a GMR sensor sandwiched between a GMR sensor bottom shield and a GMR sensor top shield. An insulating gap layer separates the GMR sensor bottom shield of the second GMR reader from the top pole of the writer.

In a seventh embodiment of the magnetic head, both of the readers are GMR readers which are tuned to sense magnetic flux differently such that the magnetic head is capable of reading two different types of magnetic media and the magnetic head further includes a writer. The first GMR reader includes a GMR sensor sandwiched between a GMR sensor bottom shield and a shared GMR/GMR sensor shield. The shared GMR/GMR sensor shield serves as a GMR sensor top shield for the GMR sensor of the first GMR reader. The second GMR reader includes a GMR sensor sandwiched between the shared GMR/GMR sensor shield and a shared shield. The shared GMR/GMR sensor shield serves as a GMR sensor bottom shield for the GMR sensor of the second GMR reader and the shared shield serves as a GMR sensor top shield for the GMR sensor of the second GMR reader. The writer includes a write gap layer on the shared shield and includes a top pole on the write gap layer. The shared shield serves as a bottom pole for the writer.

In an eighth embodiment of the magnetic head, both of the readers are GMR readers which are tuned to sense magnetic flux differently such that the magnetic head is capable of reading two different types of magnetic media and the magnetic head further includes a writer. The first GMR reader includes a GMR sensor sandwiched between a GMR sensor bottom shield and a shared GMR/GMR sensor shield. The shared GMR/GMR sensor shield serves as a GMR sensor top shield for the GMR sensor of the first GMR reader. The second GMR reader includes a GMR sensor sandwiched between the shared GMR/GMR sensor shield and a shared shield. The shared GMR/GMR sensor shield serves as a GMR sensor bottom shield for the GMR sensor of the second GMR reader. The shared shield includes a main body portion and a pedestal portion. The main body portion serves as a GMR sensor top shield for the GMR sensor of the second GMR reader. The writer includes a write gap layer on the pedestal portion and includes a top pole on the write gap layer. The pedestal portion serves as a bottom pole for the writer.

In a ninth embodiment of the magnetic head, both of the readers are AMR readers which are tuned to sense magnetic flux differently such that the magnetic head is capable of reading two different types of magnetic media and the magnetic head further includes a writer. The writer includes a bottom pole separated from a shared shield by a write gap layer. The shared shield serves as a top pole for the writer. The first AMR reader includes an AMR sensor sandwiched between the shared shield and a shared AMR/AMR sensor shield. The shared shield serves as an AMR sensor bottom shield for the AMR sensor of the first AMR reader and the shared AMR/AMR sensor shield serves as an AMR sensor top shield for the AMR sensor of the first AMR reader. The second AMR reader includes an AMR sensor sandwiched between the shared AMR/AMR sensor shield and an AMR sensor top shield. The shared AMR/AMR sensor shield serves as an AMR sensor bottom shield for the AMR sensor of the second AMR reader.

In a tenth embodiment of the magnetic head, both of the readers are AMR readers which are tuned to sense magnetic flux differently such that the magnetic head is capable of reading two different types of magnetic media and the magnetic head further includes a writer. The writer includes a bottom pole, a write gap layer, and a shared shield. The shared shield includes a main body portion and a pedestal portion. The write gap layer separates the bottom pole from the pedestal portion. The pedestal portion serves as a top pole for the writer. The first AMR reader includes an AMR sensor sandwiched between the main body portion and a shared AMR/AMR sensor shield. The main body portion serves as an AMR sensor bottom shield for the AMR sensor of the first AMR reader. The shared AMR/AMR sensor shield serves as an AMR sensor top shield for the AMR sensor of the first AMR reader. The second AMR reader includes an AMR sensor sandwiched between the shared AMR/AMR sensor shield and an AMR sensor top shield. The shared AMR/AMR sensor shield serves as an AMR sensor bottom shield for the AMR sensor of the second AMR reader.

In an eleventh embodiment of the magnetic head, both of the readers are GMR readers which are tuned to sense magnetic flux differently such that the magnetic head is capable of reading two different types of magnetic media and the magnetic head further includes a writer. The writer includes a bottom pole separated from a shared shield by a write gap layer. The shared shield serves as a top pole for the writer. The first GMR reader includes a GMR sensor sandwiched between the shared shield and a shared GMR/GMR sensor shield. The shared shield serves as a GMR sensor bottom shield for the GMR sensor of the first GMR reader and the shared GMR/GMR sensor shield serves as a GMR sensor top shield for the GMR sensor of the first GMR reader. The second GMR reader includes a GMR sensor sandwiched between the shared GMR/GMR sensor shield and a GMR sensor top shield. The shared GMR/GMR sensor shield serves as a GMR sensor bottom shield for the GMR sensor of the second GMR reader.

In a twelfth embodiment of the magnetic head, both of the readers are GMR readers which are tuned to sense magnetic flux differently such that the magnetic head is capable of reading two different types of magnetic media and the magnetic head further includes a writer. The writer includes a bottom pole, a write gap layer, and a shared shield. The shared shield includes a main body portion and a pedestal portion. The write gap layer separates the bottom pole from the pedestal portion. The pedestal portion serves as a top pole for the writer. The first GMR reader includes a GMR sensor sandwiched between the main body portion and a shared GMR/GMR sensor shield. The main body portion serves as a GMR sensor bottom shield for the GMR sensor of the first GMR reader. The shared GMR/GMR shield serves as a GMR sensor top shield for the GMR sensor of the first GMR reader. The second GMR reader includes a GMR sensor sandwiched between the shared GMR/GMR sensor shield and a GMR sensor top shield. The shared GMR/GMR sensor shield serves as a GMR sensor bottom shield for the GMR sensor of the second GMR reader.

In a thirteenth embodiment of the magnetic head, both of the readers are AMR readers which are tuned to sense magnetic flux differently such that the magnetic head is capable of reading two different types of magnetic media and the magnetic head is void of a writer. The first AMR reader includes an AMR sensor sandwiched between an AMR sensor bottom shield and a shared AMR/AMR sensor shield. The shared AMR/AMR sensor shield serves as an AMR sensor top shield for the AMR sensor of the first AMR reader. The second AMR reader includes an AMR sensor sandwiched between the shared AMR/AMR sensor shield and an AMR sensor top shield. The shared AMR/AMR sensor shield serves as an AMR sensor bottom shield for the AMR sensor of the second AMR reader.

In a fourteenth embodiment of the magnetic head, both of the readers are GMR readers which are tuned to sense magnetic flux differently such that the magnetic head is capable of reading two different types of magnetic media and the magnetic head is void of a writer. The first GMR reader includes a GMR sensor sandwiched between a GMR sensor bottom shield and a shared GMR/GMR sensor shield. The shared GMR/GMR sensor shield serves as a GMR sensor top shield for the GMR sensor of the first GMR reader. The second GMR reader includes a GMR sensor sandwiched between the shared GMR/GMR sensor shield and a GMR sensor top shield. The shared GMR/GMR sensor shield serves as a GMR sensor bottom shield for the GMR sensor of the second GMR reader.

DETAILED DESCRIPTION OF THE PREFERRED EMBODIMENT(S)

Figure 1:
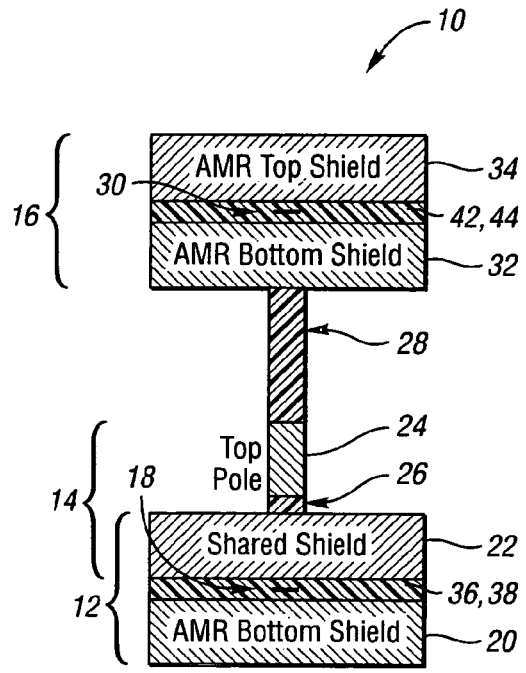
FIGS. 1 through 14 illustrate a magnetic head in accordance with respective embodiments of the present invention.

Referring now to FIG. 1, a magnetic head 10 in accordance with a first embodiment of the present invention is shown. FIG. 1 illustrates a cross-sectional view of magnetic head 10 parallel to an air-bearing surface which faces a magnetic media such as a magnetic tape or any other fixed or removable magnetic storage media. Magnetic head 10 includes a first anisotropic magneto-resistive (AMR) reader 12, a writer 14, and a second AMR reader 16 which are supported on a substrate in a stacked fashion. First AMR reader 12 and second AMR reader 16 are tuned differently with respect to one another to sense magnetic flux differently such that magnetic head 10 is capable of reading two different types of magnetic media.

First AMR reader 12, which is deposited on the substrate, includes an AMR sensor 18 sandwiched between an AMR sensor bottom shield 20 and a shared shield 22. Shared shield 22 serves as an AMR sensor top shield for AMR sensor 18. Writer 14, which is deposited on first AMR reader 12, includes a top pole 24 separated at the air-bearing surface from shared shield 22 by a write gap layer 26. Shared shield 22 serves as a bottom pole for writer 14. Away from the air-bearing surface, top pole 24 and shared shield 22 are magnetically coupled to one another. This magnetic coupling allows a flux return path and enables writer 14 to write data onto the media. Second AMR reader 16, which is deposited on an insulating gap layer 28 on writer 14, includes an AMR sensor 30 sandwiched between an AMR sensor bottom shield 32 and an AMR sensor top shield 34.

In a manufacturing method of magnetic head 10, the elements of first AMR reader 12 are initially deposited on the substrate, followed by the deposition of the elements of writer 14 onto the first AMR reader, followed by the deposition of the elements of second AMR reader 16 onto the writer.

To form first AMR reader 12, an insulating layer is deposited on the substrate. Next, a magnetic material is deposited on the insulating layer and is formed into AMR sensor bottom shield 20. A shield gap film 36 is deposited on AMR sensor bottom shield 20. An AMR film is formed on shield gap film 36 to form AMR sensor 18. Next, after forming a lead layer (not shown) as an extraction electrode which is electrically connected to AMR sensor 18, a shield gap film 38 is formed on the lead layer, shield gap film 36, and AMR sensor 18. As such, AMR sensor 18 is buried between shield gap films 36, 38. Further, shared shield 22, made of a magnetic material, is selectively formed on shield gap film 38. As indicated above, shared shield 22 serves as the AMR sensor top shield for AMR sensor 18.

As indicated above, shared shield 22 also serves as the bottom pole for writer 14. To form writer 14, write gap layer 26 is deposited on shared shield 22. Coils (not shown) are then formed on write gap layer 26 away from the air-bearing surface by, for example, electroplating. Away from the air-bearing surface write gap layer 26 is selectively etched to form a magnetic path between shared shield 22 and top pole 24. Top pole 24, made of a magnetic material, is then selectively formed on write gap layer 26 and the coils. Top pole 24 contacts shared shield 22 at a point away from the air-bearing surface and is magnetically coupled to the shared shield. Top pole 24 has a width at the air-bearing surface which defines the width of a recording track in the media.

Prior to forming second AMR reader 16, an insulating gap layer 28 is deposited over top pole 24. Second AMR reader 16 is then formed on insulating gap layer 28. To form second AMR reader 16, a magnetic material is deposited on insulating gap layer 28 to form AMR sensor bottom shield 32. A shield gap film 42 is deposited on AMR sensor bottom shield 32. An AMR film is formed on shield gap film 42 to form AMR sensor 30. Next, after forming a lead layer (not shown) as an extraction electrode which is electrically connected to AMR sensor 30, a shield gap film 44 is formed on the lead layer, shield gap film 42, and AMR sensor 30. As such, AMR sensor 30 is buried between shield gap films 42, 44. Further, AMR sensor top shield 34, made of a magnetic material, is selectively formed on shield gap film 44.

AMR sensor 18 of first AMR reader 12, top pole 24 of writer 14, and AMR sensor 30 of second AMR reader 16 are vertically aligned with one another as shown in FIG. 1. This vertical alignment shown in FIG. 1 is by no means the only alignment possible. For example, in a helical process the writer and reader elements are offset from each other. Regardless of the geometrical alignment, first AMR reader 12 and second AMR reader 16 are tuned differently with respect to one another such that AMR sensor 18 of the first AMR reader is capable of sensing magnetic flux from one type of magnetic media and AMR sensor 30 of the second AMR reader is capable of sensing magnetic flux from another type of magnetic media.

Figure 2:
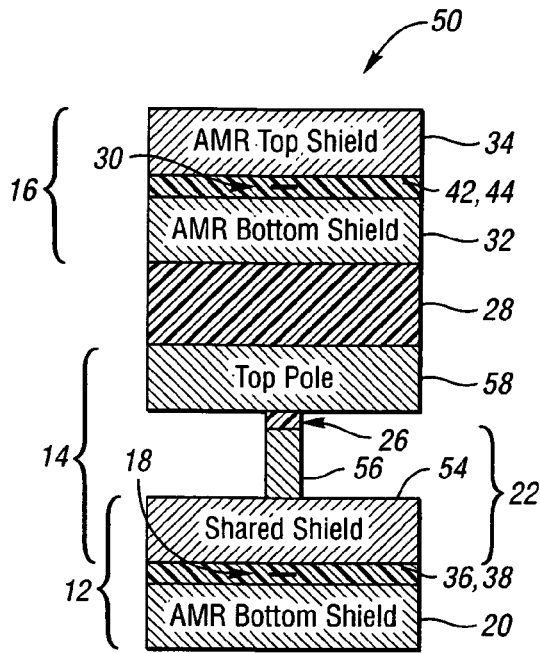

Referring now to FIG. 2, with continual reference to FIG. 1, a magnetic head 50 in accordance with a second embodiment of the present invention is shown. FIG. 2 illustrates a cross-sectional view of magnetic head 50 parallel to an air-bearing surface which faces magnetic media. Magnetic head 50 generally includes the same elements as magnetic head 10 and like elements have the same reference numerals in FIG. 2.

Magnetic head 50 differs from magnetic head 10 by having different shared shield and top pole configurations. Specifically, first AMR reader 12 and writer 14 include a shared shield 22. Shared shield 22 includes a main body portion 54 and a pedestal portion 56. Main body portion 54 is identical to shared shield 22 of magnetic head 10 and serves as an AMR sensor top shield for AMR sensor 18. Pedestal portion 56 is formed on main body portion 54 and serves as a bottom pole for writer 14. Pedestal portion 56 has a width at the air-bearing surface which defines the recording track width in the media.

Writer 14 of magnetic head 50 includes a top pole 58. Top pole 58 is separated at the air-bearing surface from pedestal portion 56 by write gap layer 26. At the air-bearing surface, top pole 58 has a width on the order of the shield widths. As such, at the air-bearing surface, top pole 58 has a width greater than the width of pedestal portion 56. As a result, pedestal portion 56 and top pole 58 of writer 14 form an inverted writer.

AMR sensor 18 of first AMR reader 12, bottom pole pedestal 56 of writer 14, and AMR sensor 30 of second AMR reader 16 are vertically aligned with one another as shown in FIG. 2 in order to read and write data in the manner described above with reference to FIG. 1. This vertical alignment shown in FIG. 2 is by no means the only alignment possible. For example, in a helical process the writer and reader elements are offset from each other. Regardless of the geometrical alignment, first AMR reader 12 and second AMR reader 16 are tuned differently with respect to one another such that AMR sensor 18 of the first AMR reader is capable of sensing magnetic flux from one type of magnetic media and AMR sensor 30 of the second AMR reader is capable of sensing magnetic flux from another type of magnetic media.

Figure 3:
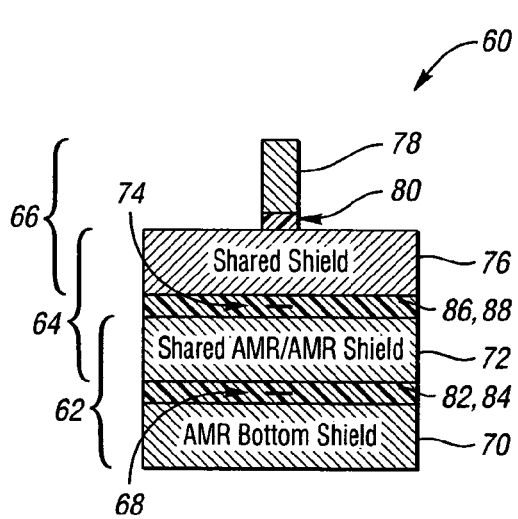

Referring now to FIG. 3, a magnetic head 60 in accordance with a third embodiment of the present invention is shown. FIG. 3 illustrates a cross-sectional view of magnetic head 60 parallel to an air-bearing surface which faces magnetic media. Magnetic head 60 includes a first AMR reader 62, a second AMR reader 64, and a writer 66 which are supported on a substrate in a stacked fashion. First AMR reader 62 and second AMR reader 64 are tuned differently with respect to one another to sense magnetic flux differently such that magnetic head 60 is capable of reading two different types of magnetic media.

First AMR reader 62, which is deposited on the substrate, includes an AMR sensor 68 sandwiched between an AMR sensor bottom shield 70 and a shared AMR/AMR sensor shield 72. Shared AMR/AMR sensor shield 72 serves as an AMR sensor top shield for AMR sensor 68.

Second AMR reader 64, which is deposited on first AMR reader 62, includes an AMR sensor 74 sandwiched between shared AMR/AMR sensor shield 72 and a shared shield 76. Shared AMR/AMR sensor shield 72 serves as an AMR bottom shield for AMR sensor 74 and shared shield 76 serves as an AMR top shield for AMR sensor 74.

Writer 66, which is deposited on second AMR reader 64, includes a top pole 78 separated at the air-bearing surface from shared shield 76 by a write gap layer 80. Shared shield 76 serves as a bottom pole for writer 66. Away from the air-bearing surface, top pole 78 and shared shield 76 contact each other in order to be magnetically coupled to one another for enabling writer 66 to write data onto the magnetic media.

In a manufacturing method of magnetic head 60, the elements of first AMR reader 62 are initially deposited on a substrate, followed by the deposition of the elements of second AMR reader 64 onto the first AMR reader, followed by the deposition of the elements of writer 66 onto the second AMR reader.

To form first AMR reader 62, an insulating layer is deposited on the substrate. Next, a magnetic material is formed on the insulating layer to form AMR sensor bottom shield 70. A shield gap film 82 is deposited on AMR sensor bottom shield 70. An AMR film is formed on shield gap film 82 to form AMR sensor 68. Next, after forming a lead layer (not shown) as an extraction electrode which is electrically connected to AMR sensor 68, a shield gap film 84 is formed on the lead layer, shield gap film 82, and AMR sensor 68. As such, AMR sensor 68 is buried between shield gap films 82, 84. Further, shared AMR/AMR sensor shield 72, made of a magnetic material, is selectively formed on shield gap film 84. Shared AMR/AMR sensor shield 72 serves as the AMR sensor top shield for AMR sensor 68.

As indicated above, shared AMR/AMR sensor shield 72 serves as an AMR sensor bottom shield for AMR sensor 74 of second AMR reader 64. To form second AMR reader 64, a shield gap film 86 is deposited on shared AMR/AMR sensor shield 72. An AMR film is formed on shield gap film 86 to form AMR sensor 74. Next, after forming a lead layer (not shown) as an extraction electrode which is electrically connected to AMR sensor 74, a shield gap film 88 is formed on the lead layer, shield gap film 86, and AMR sensor 74. As such, AMR sensor 74 is buried between shield gap films 86, 88. Further, a magnetic material is formed on shield gap film 88 to form shared shield 76. As indicated above, shared shield 76 serves as the AMR sensor top shield for AMR sensor 74.

As indicated above, shared shield 76 serves as the bottom pole for writer 66. To form writer 66, write gap layer 80 is deposited on shared shield 76. Coils (not shown) are then formed on write gap layer 80 away from the air-bearing surface. Write gap layer 80 is selectively etched away from the air-bearing surface to form a magnetic path between shared shield 76 and top pole 78. Top pole 78, made of a magnetic material, is then selectively formed on write gap layer 80 and the coils. Top pole 78 contacts shared shield 76 at a point away from the air-bearing surface to be magnetically coupled to the shared shield. Top pole 78 has a width at the air-bearing surface which defines the width of a recording track in the media.

AMR sensor 68 of first AMR reader 62, AMR sensor 74 of second AMR reader 64, and top pole 78 of writer 66 are vertically aligned with one another as shown in FIG. 3. This vertical alignment shown in FIG. 3 is by no means the only alignment possible. Again, for example, in a helical process the writer and reader elements are offset from each other. Regardless of the geometrical alignment, first AMR reader 62 and second AMR reader 64 are tuned differently with respect to one another such that AMR sensor 68 of the first AMR reader is capable of sensing magnetic flux from one type of magnetic media and AMR sensor 74 of the second AMR reader is capable of sensing magnetic flux from another type of magnetic media.

Figure 4:
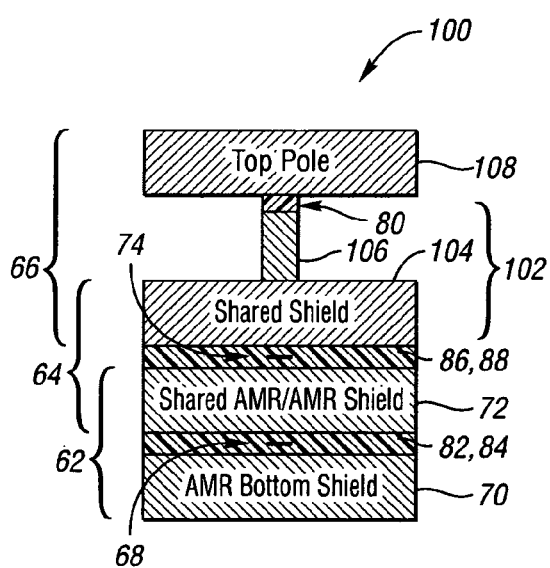

Referring now to FIG. 4, with continual reference to FIGS. 2 and 3, a magnetic head 100 in accordance with a fourth embodiment of the present invention is shown. FIG. 4 illustrates a cross-sectional view of magnetic head 100 parallel to an air-bearing surface which faces magnetic media. Magnetic head 100 generally includes the same elements as magnetic head 60 and like elements have the same reference numerals in FIG. 4.

Magnetic head 100 differs from magnetic head 60 by having different shared shield and top pole configurations. Specifically, second AMR reader 64 and writer 66 include shared shield 102. Shared shield 102 includes a main body portion 104 and a pedestal portion 106. Main body portion 104 is identical to shared shield 76 of magnetic head 60 and serves as an AMR sensor top shield for AMR sensor 74. Pedestal portion 106 is formed on main body portion 104 and serves as a bottom pole for writer 66. Pedestal portion 106 has a width at the air-bearing surface which defines the recording track width in the media.

Writer 66 of magnetic head 100 includes a top pole 108. Top pole 108 is separated at the air-bearing surface from pedestal portion 106 by write gap layer 80. At the air-bearing surface, top pole 108 has a width on the order of the shield widths. As such, at the air-bearing surface, top pole 108 has a width greater than the width of pedestal portion 106. As a result, pedestal portion 106 and top pole 108 of writer 66 form an inverted writer.

AMR sensor 68, AMR sensor 74, and bottom pole pedestal 106 of writer 66 are vertically aligned with one another as shown in FIG. 4 in order to read and write data in the manner described above with reference to FIG. 3. This vertical alignment shown in FIG. 4 is by no means the only alignment possible. For example, in a helical process the writer and reader elements are offset from each other. Regardless of the geometrical alignment, first AMR reader 62 and second AMR reader 64 are tuned differently with respect to one another such that AMR sensor 68 of the first AMR reader is capable of sensing magnetic flux from one type of magnetic media and AMR sensor 74 of the second AMR reader is capable of sensing magnetic flux from another type of magnetic media.

FIGS. 5, 6, 7, and 8 respectively illustrate fifth, sixth, seventh, and eighth embodiments of a magnetic head in accordance with the present invention. The set of magnetic head embodiments illustrated in FIGS. 5, 6, 7, and 8 correspond respectively to the set of magnetic head embodiments illustrated in FIGS. 1, 2, 3, and 4. A general difference between the two sets of embodiments is that the embodiments illustrated in FIGS. 5, 6, 7, and 8 include GMR readers whereas the embodiments illustrated in FIGS. 1, 2, 4, and 4 include AMR readers. The manufacturing methods for forming the magnetic head embodiments shown in FIGS. 5, 6, 7, and 8 are generally similar to the described manufacturing methods for forming the magnetic head embodiments shown in FIGS. 1, 2, 3, and 4.

Like FIGS. 1, 2, 3, and 4, FIGS. 5, 6, 7, and 8 also illustrate cross-sectional views of the magnetic head embodiments parallel to an air-bearing surface which faces magnetic media. The manner in which the magnetic head embodiments illustrated in FIGS. 5, 6, 7, and 8 write and read data to and from the magnetic media corresponds to the manner in which the magnetic head embodiments illustrated in FIGS. 1, 2, 3, and 4 write and read data to and from the magnetic media.

Figure 5:
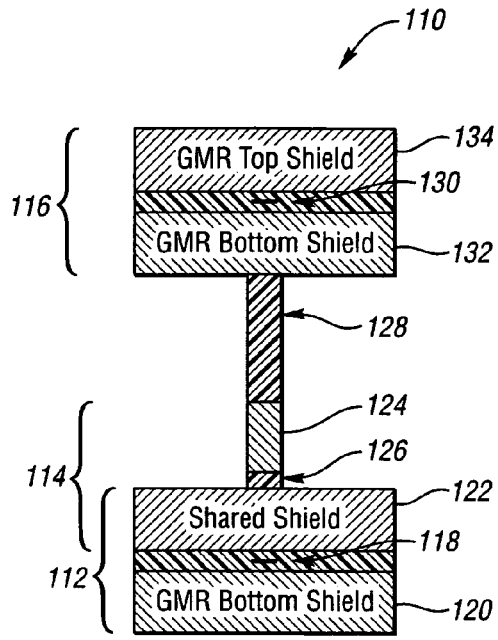

Referring now to FIG. 5, with continual reference to FIG. 1, a magnetic head 110 in accordance with a fifth embodiment of the present invention is shown. Magnetic head 110 includes a first GMR reader 112, a writer 114, and a second GMR reader 116 which are supported on a substrate in a stacked fashion. First GMR reader 112 and second GMR reader 116 are tuned differently with respect to one another to sense magnetic flux differently such that magnetic head 110 is capable of reading two different types of magnetic media.

First GMR reader 112, which is deposited on the substrate, includes a GMR sensor 118 sandwiched between a GMR sensor bottom shield 120 and a shared shield 122. GMR sensor 118 is buried within a shield film gap. Shared shield 122 serves as a GMR sensor top shield for GMR sensor 118. Writer 114, which is deposited on first GMR reader 112, includes a top pole 124 separated at the air-bearing surface from shared shield 122 by a write gap layer 126. Shared shield 122 serves as a bottom pole for writer 114. Away from the air-bearing surface, top pole 124 and shared shield 122 are magnetically coupled to one another. Second GMR reader 116, which is deposited on an insulating gap layer 128 on writer 114, includes a GMR sensor 130 sandwiched between a GMR sensor bottom shield 132 and a GMR sensor top shield 134. GMR sensor 130 is also buried within a shield film gap.

Figure 6:
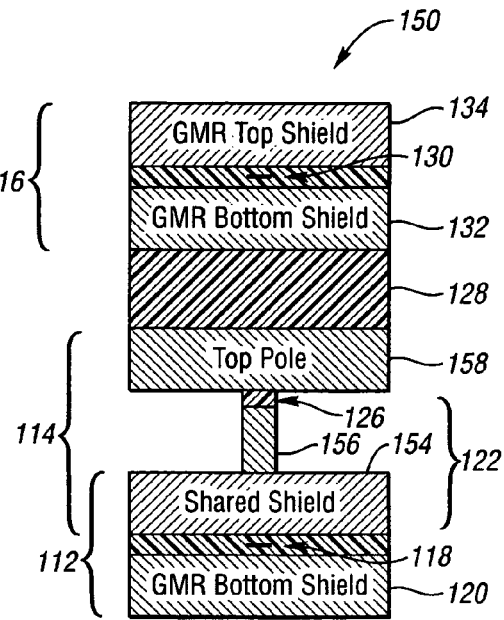

Referring now to FIG. 6, with continual reference to FIGS. 2 and 5, a magnetic head 150 in accordance with a sixth embodiment of the present invention is shown. Magnetic head 150 generally includes the same elements as magnetic head 110 as shown in FIG. 5 and like elements have the same reference numerals in FIG. 6.

Magnetic head 150 differs from magnetic head 110 by having different shared shield and top pole configurations. Specifically, first GMR reader 112 and writer 114 include a shared shield 122. Shared shield 122 includes a main body portion 154 and a pedestal portion 156. Main body portion 154 is identical to shared shield 122 of magnetic head 110 and serves as a GMR sensor top shield for GMR sensor 118. Pedestal portion 156 is formed on main body portion 154 and serves as a bottom pole for writer 114. Pedestal portion 156 has a width at the air-bearing surface which defines the recording track width in the media.

Writer 114 includes a top pole 158 separated at the air-bearing surface by write gap layer 126. At the air-bearing surface, top pole 158 has a width on the order of the shield widths. As such, at the air-bearing surface, top pole 158 has a width greater than the width of pedestal portion 156. As a result, pedestal portion 156 and top pole 158 of writer 114 form an inverted writer.

GMR sensor 118 of first GMR reader 112, bottom pole pedestal 156, and GMR sensor 130 of second GMR reader 116 are vertically aligned with one another as shown in FIG. 6 in order to read and write data to and from media. This vertical alignment shown in FIG. 6 is by no means the only alignment possible. For example, in a helical process the writer and reader elements are offset from each other. Regardless of the geometrical alignment, first GMR reader 112 and second GMR reader 116 are tuned differently with respect to one another such that GMR sensor 118 of the first GMR reader is capable of sensing magnetic flux from one type of magnetic media and GMR sensor 130 of the second GMR reader is capable of sensing magnetic flux from another type of magnetic media.

Figure 7:
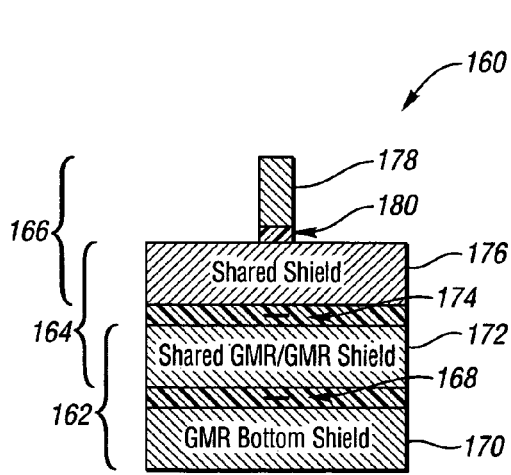

Referring now to FIG. 7, with continual reference to FIG. 3, a magnetic head 160 in accordance with a seventh embodiment of the present invention is shown. Magnetic head 160 includes a first GMR reader 162, a second GMR reader 164, and a writer 166 which are supported on a substrate in a stacked fashion. First GMR reader 162 and second GMR reader 164 are tuned differently with respect to one another to sense magnetic flux differently such that magnetic head 160 is capable of reading two different types of magnetic media.

First GMR reader 162, which is deposited on the substrate, includes a GMR sensor 168 sandwiched between a GMR sensor bottom shield 170 and a shared GMR/GMR sensor shield 172. GMR sensor 168 is buried within a shield film gap. Shared GMR shield 172 serves as a GMR sensor top shield for GMR sensor 168. Second GMR reader 164, which is deposited on first GMR reader 162, includes a GMR sensor 174 sandwiched between shared GMR/GMR sensor shield 172 and a shared shield 176. Shared GMR/GMR sensor shield 172 serves as a GMR sensor bottom shield for GMR sensor 174 and shared shield 176 serves as a GMR sensor top shield for GMR sensor 174. Writer 166, which is deposited on second GMR reader 164, includes a top pole 178 separated at the air-bearing surface from shared shield 176 by a write gap layer 180. Shared shield 176 serves as a bottom pole for writer 166. Away from the air-bearing surface, top pole 178 and shared shield 176 are magnetically coupled to one another for enabling writer 166 to write data onto the media.

Figure 8:
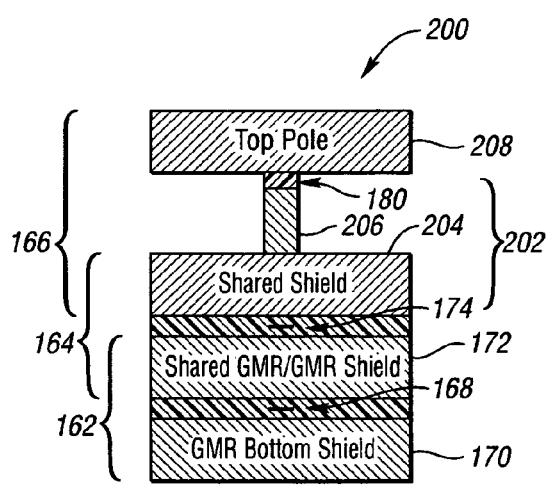

Referring now to FIG. 8, with continual reference to FIGS. 4 and 7, a magnetic head 200 in accordance with an eighth embodiment of the present invention is shown. Magnetic head 200 generally includes the same elements as magnetic head 160 as shown in FIG. 7 and like elements have the same reference numerals in FIG. 8. First GMR reader 162 and second GMR reader 164 are tuned differently with respect to one another to sense magnetic flux differently such that magnetic head 200 is capable of reading two different types of magnetic media.

Magnetic head 200 differs from magnetic head 160 by having different shared shield and top pole configurations. Specifically, second GMR reader 164 and writer 166 include shared shield 202. Shared shield 202 includes a main body portion 204 and a pedestal portion 206. Main body portion 204 is identical to shared shield 176 of magnetic head 160 and serves as a GMR sensor top shield for GMR sensor 174. Pedestal portion 206 is formed on main body portion 204 and serves as a bottom pole for writer 166. Pedestal portion 206 has a width at the air-bearing surface which defines the recording track width in the media.

Writer 166 of magnetic head 200 includes a top pole 208. Top pole 208 is separated at the air-bearing surface from pedestal portion 206 by write gap layer 180. At the air-bearing surface, top pole 208 has a width on the order of the shield widths. As such, at the air-bearing surface, top pole 208 has a width greater than the width of pedestal portion 206. As a result, pedestal portion 206 and top pole 208 of writer 166 form an inverted writer.

GMR sensor 168, GMR sensor 174, and bottom pole pedestal 206 are vertically aligned with one another as shown in FIG. 8 in order to read and write data to and from media. This vertical alignment shown in FIG. 8 is by no means the only alignment possible. For example, in a helical process the writer and reader elements are offset from each other. Regardless of the geometrical alignment, first GMR reader 162 and second GMR reader 164 are tuned differently with respect to one another such that GMR sensor 168 of the first AMR reader is capable of sensing magnetic flux from one type of magnetic media and GMR sensor 174 of the second AMR reader is capable of sensing magnetic flux from another type of magnetic media.

Figure 9:
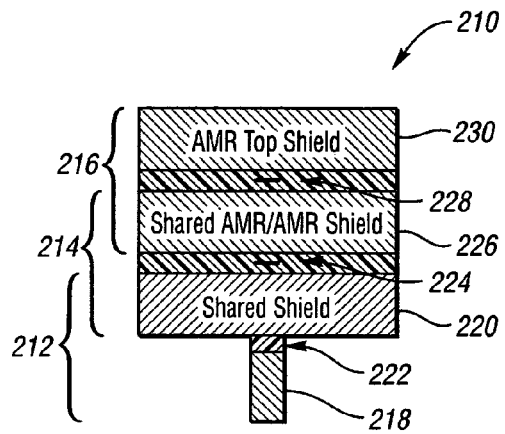

Referring now to FIG. 9, a magnetic head 210 in accordance with a ninth embodiment of the present invention is shown. FIG. 9 illustrates a cross-sectional view of magnetic head 210 parallel to an air-bearing surface which faces magnetic media. Magnetic head 210 includes a writer 212, a first AMR reader 214, and a second AMR reader 216 which are supported on a substrate in a stacked fashion. First AMR reader 214 and second AMR reader 216 are tuned differently with respect to one another to sense magnetic flux differently such that magnetic head 210 is capable of reading two different types of magnetic media.

Writer 212, which is deposited on the substrate, includes a bottom pole 218 separated at the air-bearing surface from a shared shield 220 by a write gap layer 222. Shared shield 220 serves as a top pole for writer 212. Away from the air-bearing surface, bottom pole 218 and shared shield 220 are magnetically coupled to one another for enabling writer 212 to write data onto the media.

First AMR reader 214, which is deposited on writer 212, includes an AMR sensor 224 sandwiched between shared shield 220 and a shared AMR/AMR sensor shield 226. Shared shield 220 serves as an AMR sensor bottom shield for AMR sensor 224 and shared AMR/AMR sensor shield 226 serves as an AMR sensor top shield for AMR sensor 224. Second AMR reader 216, which is deposited on first AMR reader 214, includes an AMR sensor 228 sandwiched between shared AMR/AMR sensor shield 226 and an AMR sensor top shield 230. Shared AMR/AMR sensor shield 226 serves as an AMR sensor bottom shield for AMR sensor 228. It is noted that shared shield 220 as shown in FIG. 9 may be difficult to fabricate in practice. As such, shared shield 220 could be broken up into a writer shield and a separate AMR sensor shield with a non-magnetic spacer interposed between these two elements.

In a manufacturing method of magnetic head 210, the elements of writer 212 are initially deposited on a substrate, followed by the deposition of the elements of first AMR reader 214 onto the writer, followed by the deposition of the elements of second AMR reader 216 onto the first AMR reader.

To form writer 212, bottom pole 218, made of a magnetic material, is selectively formed on the substrate. At the air-bearing surface, bottom pole 218 has a width as shown in FIG. 9 which defines the recording track width. Write gap layer 222 is then deposited on bottom pole 218. Coils (not shown) are then formed on write gap layer 222 away from the air-bearing surface. Write gap layer 222 is then selectively etched away from the air-bearing surface to form a magnetic path between bottom pole 218 and shared shield 220. Shared shield 220, made of a magnetic material, is then selectively formed on write gap layer 222 and the coils. As indicated above, shared shield 220 functions as the top pole for writer 212. Bottom pole 218 contacts shared shield 220 at a point away from the air-bearing surface to be magnetically coupled to the shared shield.

As indicated above, shared shield 220 serves as the AMR sensor bottom shield for AMR sensor 224 of first AMR reader 214. To form first AMR reader 214, a shield gap film is deposited on shared shield 220. An AMR film is formed on this shield gap film to form AMR sensor 224. Next, after forming a lead layer (not shown) as an extraction electrode which is electrically connected to AMR sensor 224, another shield gap film is formed on the lead layer, the first shield gap film, and AMR sensor 224. As such, AMR sensor 224 is buried between shield gap films. A magnetic material is then formed on the second shield gap film to form shared AMR/AMR sensor shield 226. As indicated above, shared AMR/AMR sensor shield 226 serves as the AMR sensor top shield for AMR sensor 224.

As indicated above, shared AMR/AMR sensor shield 226 serves as the AMR sensor bottom shield for AMR sensor 228 of second AMR reader 216. To form second AMR reader 216, a shield gap film is deposited on shared AMR/AMR sensor shield 226. An AMR film is then formed on this shield gap film to form AMR sensor 228. Next, after forming a lead layer (not shown) as an extraction electrode which is electrically connected to AMR sensor 228, a second shield gap film is formed on the lead layer, the first shield gap film, and AMR sensor 228. As such, AMR sensor 228 is buried between the shield gap films. AMR sensor top shield 230, made of a magnetic material, is then selectively formed on the second shield gap film.

Bottom pole 218 of writer 212, AMR sensor 224 of first AMR reader 214, and AMR sensor 228 of second AMR reader 216 are vertically aligned with one another as shown in FIG. 9. This vertical alignment shown in FIG. 9 is by no means the only alignment possible. For example, in a helical process the writer and reader elements are offset from each other. As such, AMR sensor 224 and AMR sensor 228 are aligned to read data. Regardless of the geometrical alignment, first AMR reader 214 and second AMR reader 216 are tuned differently with respect to one another such that AMR sensor 224 of the first AMR reader is capable of sensing magnetic flux from one type of magnetic media and AMR sensor 228 of the second AMR reader is capable of sensing magnetic flux from another type of magnetic media.

Further, magnetic head 210, shown in FIG. 9, represents an inverted stacking compared with the stacking of magnetic head 60 shown in FIG. 3. The stacking of magnetic head 210 enables the patterning of bottom pole 218 of writer 212 to be done early in the manufacturing process as compared to patterning top pole 78 of magnetic head 60 later in the manufacturing process.

Figure 10:
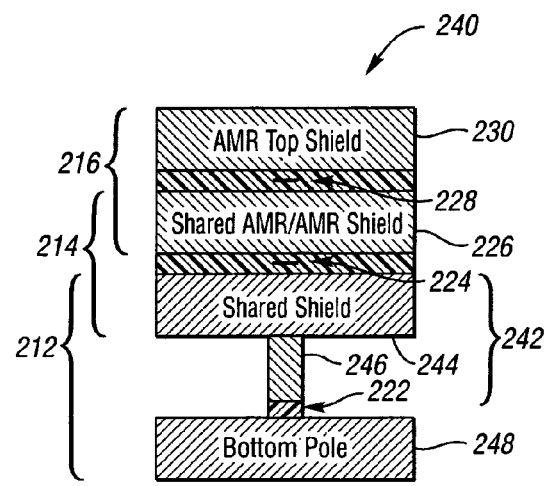

Referring now to FIG. 10, with continual reference to FIG. 9, a magnetic head 240 in accordance with a tenth embodiment of the present invention is shown. FIG. 10 illustrates a cross-sectional view of magnetic head 240 parallel to an air-bearing surface which faces magnetic media. Magnetic head 240 generally includes the same elements as magnetic head 210 and like elements have the same reference numerals in FIG. 10.

Magnetic head 240 differs from magnetic head 210 by having different shared shield and top and bottom pole configurations. Specifically, writer 212 and first AMR reader 214 include a shared shield 242. Shared shield 242 includes a main body portion 244 and a pedestal portion 246. Main body portion 244 is identical to shared shield 220 of magnetic head 210 and serves as an AMR sensor bottom shield for AMR sensor 224 of first AMR reader 214. Main body portion 244 is formed on pedestal portion 246 which serves as a top pole for writer 212. Pedestal portion 246 has a width at the air-bearing surface which defines the recording track width in the magnetic media. It is noted that main body portion 244 of shared shield 242 as shown in FIG. 10 may be difficult to fabricate in practice. As such, main body portion 244 could be broken up into a writer pole and a separate AMR sensor shield with a non-magnetic spacer interposed between these two elements.

Writer 212 further includes a bottom pole 248. Bottom pole 248 is separated at the air-bearing surface from pedestal portion 246 by write gap layer 222. At the air-bearing surface, bottom pole 248 has a width on the order of the shield widths. As such, at the air-bearing surface, bottom pole 248 has a width greater than the width of pedestal portion 246. Pedestal portion 246, AMR sensor 224 of first AMR reader 214, and AMR sensor 228 of second AMR reader 216 are vertically aligned with one another as shown in FIG. 10 in order to read and write data to and from the magnetic media. This vertical alignment shown in FIG. 10 is by no means the only alignment possible. For example, in a helical process the writer and reader elements are offset from each other. Regardless of the geometrical alignment, first AMR reader 214 and second AMR reader 216 are tuned differently with respect to one another such that AMR sensor 224 of the first AMR reader is capable of sensing magnetic flux from one type of magnetic media and AMR sensor 228 of the second AMR reader is capable of sensing magnetic flux from another type of magnetic media.

Figure 11:
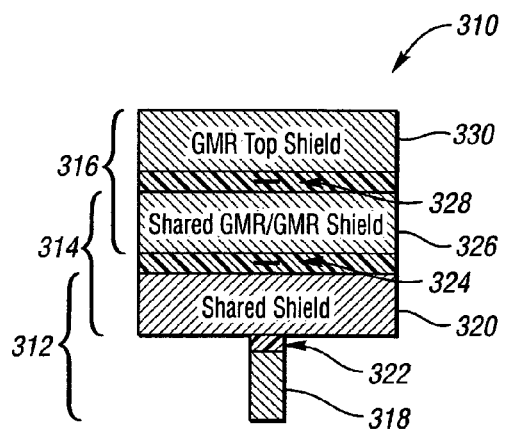
Figure 12:
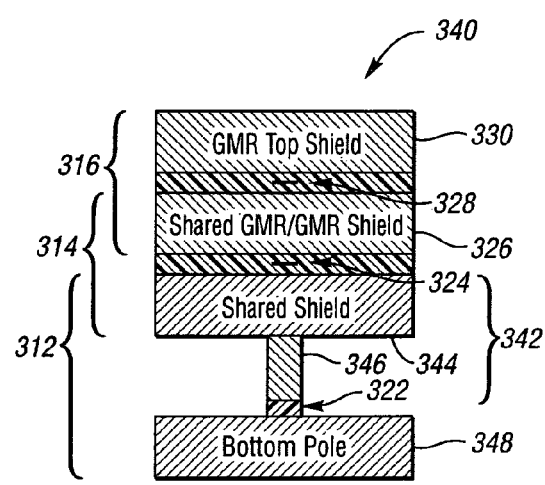

FIGS. 11 and 12 respectively illustrate eleventh and twelfth embodiments of a magnetic head in accordance with the present invention. The set of magnetic head embodiments illustrated in FIGS. 11 and 12 correspond respectively to the set of magnetic head embodiments illustrated in FIGS. 9 and 10. A general difference between the two sets of embodiments is that the embodiments illustrated in FIGS. 11 and 12 include GMR readers whereas the embodiments illustrated in FIGS. 9 and 10 include AMR readers. The manufacturing methods for forming the magnetic head embodiments shown in FIGS. 11 and 12 are generally similar to the described manufacturing methods for forming the magnetic head embodiments shown in FIGS. 9 and 10. Like FIGS. 9 and 10, FIGS. 11 and 12 illustrate cross-sectional views of the magnetic head embodiments parallel to an air-bearing surface which faces magnetic media. The manner in which the magnetic head embodiments illustrated in FIGS. 11 and 12 write and read data to and from the magnetic media corresponds to the manner in which the magnetic head embodiments illustrated in FIGS. 9 and 10 write and read data to and from the magnetic media.

Referring now to FIG. 11, a magnetic head 310 in accordance with an eleventh embodiment of the present invention is shown. FIG. 11 illustrates a cross-sectional view of magnetic head 310 parallel to an air-bearing surface which faces magnetic media. Magnetic head 310 includes a writer 312, a first GMR reader 314, and a second GMR reader 316 which are supported on a substrate in a stacked fashion. First GMR reader 314 and second GMR reader 316 are tuned differently with respect to one another to sense magnetic flux differently such that magnetic head 310 is capable of reading two different types of magnetic media.

Writer 312, which is deposited on the substrate, includes a bottom pole 318 separated at the air-bearing surface from a shared shield 320 by a write gap layer 322. Shared shield 320 serves as a top pole for writer 312. Away from the air-bearing surface, bottom pole 318 and shared shield 320 are magnetically coupled to one another for enabling writer 312 to write data onto the magnetic media.

First GMR reader 314, which is deposited on writer 312, includes a GMR sensor 324 sandwiched between shared shield 320 and a shared GMR/GMR sensor shield 326. Shared shield 320 serves as a GMR sensor bottom shield for GMR sensor 324 and shared GMR/GMR sensor shield 326 serves as a GMR sensor top shield for GMR sensor 324. Second GMR reader 316, which is deposited on first GMR reader 314, includes a GMR sensor 328 sandwiched between shared GMR/GMR sensor shield 326 and a GMR sensor top shield 330. Shared GMR/GMR sensor shield 326 serves as a GMR sensor bottom shield for GMR sensor 328. It is noted that shared shield 320 as shown in FIG. 11 may be difficult to fabricate in practice. As such, shared shield 320 could be broken up into a writer shield and a separate GMR sensor shield with a non-magnetic spacer interposed between these two elements.

Referring now to FIG. 12, with continual reference to FIG. 11, a magnetic head 340 in accordance with a twelfth embodiment of the present invention is shown. FIG. 12 illustrates a cross-sectional view of magnetic head 340 parallel to an air-bearing surface which faces magnetic media. Magnetic head 340 generally includes the same elements as magnetic head 310 and like elements have the same reference numerals in FIG. 12.

Magnetic head 340 differs from magnetic head 310 by having different shared shield and top and bottom pole configurations. Specifically, writer 312 and first GMR reader 314 include a shared shield 342. Shared shield 342 includes a main body portion 344 and a pedestal portion 346. Main body portion 344 is identical to shared shield 320 of magnetic head 310 and serves as a GMR sensor bottom shield for GMR sensor 324. Main body portion 344 is formed on pedestal portion 346 which serves as a top pole for writer 312. Pedestal portion 346 has a width at the air-bearing surface which defines the recording track width in the media. It is noted that main body portion 344 of shared shield 342 as shown in FIG. 12 may be difficult to fabricate in practice. As such, main body portion 344 could be broken up into a writer pole and a separate GMR sensor shield with a non-magnetic spacer interposed between these two elements.

Writer 312 further includes a bottom pole 348. Bottom pole 348 is separated at the air-bearing surface from pedestal portion 346 by write gap layer 322. At the air-bearing surface, bottom pole 348 has a width on the order of the shield widths. As such, at the air-bearing surface, bottom pole 348 has a width greater than the width of pedestal portion 346. Pedestal portion 346 of writer 312, GMR sensor 324, and GMR sensor 328 are vertically aligned with one another as shown in FIG. 12 in order to read and write data to and from media. This vertical alignment shown in FIG. 12 is by no means the only alignment possible. For example, in a helical process the writer and reader elements are offset from each other. Regardless of the geometrical alignment, first GMR reader 314 and second GMR reader 316 are tuned differently with respect to one another such that GMR sensor 224 of the first GMR reader is capable of sensing magnetic flux from one type of magnetic media and GMR sensor 228 of the second GMR reader is capable of sensing magnetic flux from another type of magnetic media.

Figure 13:
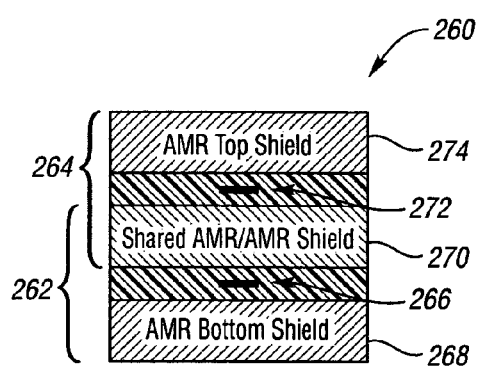
Figure 14:
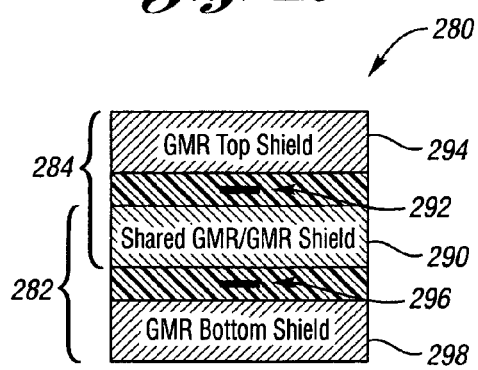

The magnetic head embodiments in accordance with the present invention have been described thus far as having two readers (i.e., two AMR readers or two GMR readers) and a writer. It is to be appreciated that the magnetic head in accordance with the present invention may only have two readers and be void of the writer. FIGS. 13 and 14 illustrate such embodiments of the magnetic head.

Referring now to FIG. 13, with continual reference to FIG. 1, a magnetic head 260 in accordance with a thirteenth embodiment of the present invention is shown. FIG. 13 illustrates a cross-sectional view of magnetic head 260 parallel to an air-bearing surface which faces magnetic media. Magnetic head 260 includes a first AMR reader 262 and a second AMR reader 264 which are supported on a substrate in a stacked fashion. First AMR reader 262 and second AMR reader 264 are tuned differently with respect to one another to sense magnetic flux differently such that magnetic head 260 is capable of reading two different types of magnetic media.

First AMR reader 262, which is deposited on the substrate, includes an AMR sensor 266 sandwiched between an AMR sensor bottom shield 268 and a shared AMR/AMR sensor shield 270. Shared AMR/AMR sensor shield 270 serves as an AMR sensor top shield for AMR sensor 266. Second AMR reader 264, which is deposited on first AMR reader 262, includes an AMR sensor 272 sandwiched between shared AMR/AMR sensor shield 270 and an AMR sensor top shield 274. Shared AMR/AMR sensor shield 270 serves as an AMR sensor bottom shield for AMR sensor 272.

Referring now to FIG. 14, with continual reference to FIG. 13, a magnetic head 280 in accordance with a fourteenth embodiment of the present invention is shown. FIG. 14 illustrates a cross-sectional view of magnetic head 280 parallel to an air-bearing surface which faces magnetic media. Magnetic head 280 includes a first GMR reader 282 and a second GMR reader 284 which are supported on a substrate in a stacked fashion. First GMR reader 282 and second GMR reader 284 are tuned differently with respect to one another to sense magnetic flux differently such that magnetic head 280 is capable of reading two different types of magnetic media.

First GMR reader 282, which is deposited on the substrate, includes a GMR sensor 296 sandwiched between a GMR sensor bottom shield 298 and a shared GMR/GMR sensor shield 290. Shared GMR/GMR sensor shield 290 serves as a GMR sensor top shield for GMR sensor 296. Second GMR reader 284, which is deposited on first GMR reader 282, includes a GMR sensor 292 sandwiched between shared GMR/GMR sensor shield 290 and a GMR sensor top shield 294. Shared GMR/GMR sensor shield 290 serves as a GMR sensor bottom shield for GMR sensor 292.

Thus, it is apparent that there has been provided, in accordance with the present invention, a magnetic head having a pair of MR readers of the same type which are tuned to sense magnetic flux differently such that the magnetic head is capable of reading two different types of magnetic media that fully satisfies the objects, aims, and advantages set forth above. While embodiments of the present invention have been illustrated and described, it is not intended that these embodiments illustrate and describe all possible forms of the present invention. Rather, the words used in the specification are words of description rather than limitation, and it is understood that various changes may be made without departing from the spirit and scope of the present invention.

What is claimed is:

1. A magnetic head comprising:
a first magneto-resistive (MR) reader; and
a second MR reader;
wherein both of the MR readers are of the same type and are tuned to sense magnetic flux differently with respect to one another with the first MR reader sensing magnetic flux emanating from a given magnetization transition with a first efficiency and the second MR reader sensing magnetic flux emanating from the given magnetization transition with a second efficiency different than the first efficiency such that the MR readers sense different amounts of magnetic flux emanating from the given magnetization transition whereby the magnetic head is capable of reading two different types of magnetic media.

2. The magnetic head of claim 1 wherein:
both of the MR readers are anisotropic magneto-resistive (AMR) readers.

3. The magnetic head of claim 2 wherein:
the first AMR reader includes an AMR sensor sandwiched between an AMR sensor bottom shield and a shared AMR/AMR sensor shield, wherein the shared AMR/AMR sensor shield serves as an AMR sensor top shield for the AMR sensor of the first AMR reader;
wherein the second AMR reader includes an AMR sensor sandwiched between the shared AMR/AMR sensor shield and an AMR sensor top shield, wherein the shared AMR/AMR sensor shield serves as an AMR sensor bottom shield for the AMR sensor of the second AMR reader.

4. The magnetic head of claim 2 wherein:
the first AMR reader includes an AMR sensor sandwiched between an AMR sensor bottom shield and a shared AMR/AMR sensor shield, wherein the shared AMR/AMR sensor shield serves as an AMR sensor top shield for the AMR sensor of the first AMR reader;
the second AMR reader includes an AMR sensor sandwiched between the shared AMR/AMR sensor shield and a shared shield, wherein the shared AMR/AMR sensor shield serves as an AMR sensor bottom shield for the AMR sensor of the second AMR reader and the shared shield serves as an AMR sensor top shield for the AMR sensor of the second AMR reader;
the magnetic head further comprising a writer, wherein the writer includes a write gap layer on the shared shield and includes a top pole on the write gap layer, wherein the shared shield serves as a bottom pole for the writer.

5. The magnetic head of claim 2 wherein:
the first AMR reader includes an AMR sensor sandwiched between an AMR sensor bottom shield and a shared AMR/AMR sensor shield, wherein the shared AMR/AMR sensor shield serves as an AMR sensor top shield for the AMR sensor of the first AMR reader;
the second AMR reader includes an AMR sensor sandwiched between the shared AMR/AMR sensor shield and a shared shield, wherein the shared AMR/AMR sensor shield serves as an AMR sensor bottom shield for the AMR sensor of the second AMR reader, wherein the shared shield includes a main body portion and a pedestal portion, wherein the main body portion serves as an AMR sensor top shield for the AMR sensor of the second AMR reader;
the magnetic head further comprising a writer, wherein the writer includes a write gap layer on the pedestal portion and includes a top pole on the write gap layer, wherein the pedestal portion serves as a bottom pole for the writer.

6. The magnetic head of claim 2 further comprising
a writer including a bottom pole separated from a shared shield by a write gap layer, wherein the shared shield serves as a top pole for the writer;
wherein the first AMR reader includes an AMR sensor sandwiched between the shared shield and a shared AMR/AMR sensor shield, wherein the shared shield serves as an AMR sensor bottom shield for the AMR sensor of the first AMR reader and the shared AMR/

AMR sensor shield serves as an AMR sensor top shield for the AMR sensor of the first AMR reader;

wherein the second AMR reader includes an AMR sensor sandwiched between the shared AMR/AMR sensor shield and an AMR sensor top shield, wherein the shared AMR/AMR sensor shield serves as an AMR sensor bottom shield for the AMR sensor of the second AMR reader.

7. The magnetic head of claim 2 further comprising:

a writer including a bottom pole, a write gap layer, and a shared shield, wherein the shared shield includes a main body portion and a pedestal portion, wherein the write gap layer separates the bottom pole from the pedestal portion, wherein the pedestal portion serves as a top pole for the writer;

wherein the first AMR reader includes an AMR sensor sandwiched between the main body portion and a shared AMR/AMR sensor shield, wherein the main body portion serves as an AMR sensor bottom shield for the AMR sensor of the first AMR reader, wherein the shared AMR/AMR sensor shield serves as an AMR sensor top shield for the AMR sensor of the first AMR reader;

wherein the second AMR reader includes an AMR sensor sandwiched between the shared AMR/AMR sensor shield and an AMR sensor top shield, wherein the shared AMR/AMR sensor shield serves as an AMR sensor bottom shield for the AMR sensor of the second AMR reader.

8. The magnetic head of claim 1 wherein:

both of the MR readers are giant magneto-resistive (GMR) readers.

9. The magnetic head of claim 8 wherein:

the first GMR reader includes a GMR sensor sandwiched between a GMR sensor bottom shield and a shared GMR/GMR sensor shield, wherein the shared GMR/GMR sensor shield serves as a GMR sensor top shield for the GMR sensor of the first GMR reader;

wherein the second GMR reader includes a GMR sensor sandwiched between the shared GMR/GMR sensor shield and a GMR sensor top shield, wherein the shared GMR/GMR sensor shield serves as a GMR sensor bottom shield for the GMR sensor of the second GMR reader.

10. The magnetic head of claim 8 wherein:

the first GMR reader includes a GMR sensor sandwiched between a GMR sensor bottom shield and a shared GMR/GMR sensor shield, wherein the shared GMR/GMR sensor shield serves as a GMR sensor top shield for the GMR sensor of the first GMR reader;

the second GMR reader includes a GMR sensor sandwiched between the shared GMR/GMR sensor shield and a shared shield, wherein the shared GMR/GMR sensor shield serves as a GMR sensor bottom shield for the GMR sensor of the second GMR reader and the shared shield serves as a GMR sensor top shield for the GMR sensor of the second GMR reader;

the magnetic head further comprising a writer, wherein the writer includes a write gap layer on the shared shield and includes a top pole on the write gap layer, wherein the shared shield serves as a bottom pole for the writer.

11. The magnetic head of claim 8 wherein:

the first GMR reader includes a GMR sensor sandwiched between a GMR sensor bottom shield and a shared GMR/GMR sensor shield, wherein the shared GMR/GMR sensor shield serves as a GMR sensor top shield for the GMR sensor of the first GMR reader;

the second GMR reader includes a GMR sensor sandwiched between the shared GMR/GMR sensor shield and a shared shield, wherein the shared GMR/GMR sensor shield serves as a GMR sensor bottom shield for the GMR sensor of the second GMR reader, wherein the shared shield includes a main body portion and a pedestal portion, wherein the main body portion serves as a GMR sensor top shield for the GMR sensor of the second GMR reader;

the magnetic head further comprising a writer, wherein the writer includes a write gap layer on the pedestal portion and includes a top pole on the write gap layer, wherein the pedestal portion serves as a bottom pole for the writer.

12. The magnetic head of claim 8 further comprising:

a writer including a bottom pole separated from a shared shield by a write gap layer, wherein the shared shield serves as a top pole for the writer;

wherein the first GMR reader includes a GMR sensor sandwiched between the shared shield and a shared GMR/GMR sensor shield, wherein the shared shield serves as a GMR sensor bottom shield for the GMR sensor of the first GMR reader and the shared GMR/GMR sensor shield serves as a GMR sensor top shield for the GMR sensor of the first GMR reader;

wherein the second GMR reader includes a GMR sensor sandwiched between the shared GMR/GMR sensor shield and a GMR sensor top shield, wherein the shared GMR/GMR sensor shield serves as a GMR sensor bottom shield for the GMR sensor of the second GMR reader.

13. The magnetic head of claim 8 further comprising:

a writer including a bottom pole, a write gap layer, and a shared shield, wherein the shared shield includes a main body portion and a pedestal portion, wherein the write gap layer separates the bottom pole from the pedestal portion, wherein the pedestal portion serves as a top pole for the writer;

wherein the first GMR reader includes a GMR sensor sandwiched between the main body portion and a shared GMR/GMR sensor shield, wherein the main body portion serves as a GMR sensor bottom shield for the GMR sensor of the first GMR reader, wherein the shared GMR/GMR sensor shield serves as a GMR sensor top shield for the GMR sensor of the first GMR reader;

wherein the second GMR reader includes a GMR sensor sandwiched between the shared GMR/GMR sensor shield and a GMR sensor top shield, wherein the shared GMR/GMR sensor shield serves as a GMR sensor bottom shield for the GMR sensor of the second GMR reader.

14. A magnetic head comprising:

a first anisotropic magneto-resistive (AMR) reader;

a second AMR reader;

wherein both of the AMR readers are of the same type and are tuned to sense magnetic flux differently with respect to one another such that the first AMR reader is capable of sensing magnetic flux from one type of magnetic media and the second AMR reader is capable of sensing magnetic flux from another type of magnetic media whereby the magnetic head is capable of reading two different types of magnetic media;

wherein the first AMR reader includes an AMR sensor sandwiched between an AMR sensor bottom shield and a shared shield, wherein the shared shield serves as an AMR sensor top shield for the AMR sensor of the first AMR reader; and a writer, wherein the writer includes a write gap layer on the shared shield and includes a top pole on the write gap layer, wherein the shared shield serves as a bottom pole for the writer;

wherein the second AMR reader includes an AMR sensor sandwiched between an AMR sensor bottom shield and an AMR sensor top shield, wherein an insulating gap layer separates the AMR sensor bottom shield of the second AMR reader from the top pole of the writer.

15. The magnetic head of claim 14 wherein:

the shared shield includes a main body portion and a pedestal portion, wherein the main body portion serves as an AMR sensor top shield for the AMR sensor of the first AMR reader;

wherein the write gap layer is on the pedestal portion, wherein the pedestal portion serves as a bottom pole for the writer.

16. A magnetic head comprising:

a first giant magneto-resistive (GMR) reader;

a second GMR reader;

wherein both of the GMR readers are of the same type and are tuned to sense magnetic flux differently with respect to one another such that the first GMR reader is capable of sensing magnetic flux from one type of magnetic media and the second GMR reader is capable of sensing magnetic flux from another type of magnetic media whereby the magnetic head is capable of reading two different types of magnetic media;

wherein the first GMR reader includes a GMR sensor sandwiched between a GMR sensor bottom shield and a shared shield, wherein the shared shield serves as a GMR sensor top shield for the GMR sensor of the first GMR reader; and a writer, wherein the writer includes a write gap layer on the shared shield and includes a top pole on the write gap layer, wherein the shared shield serves as a bottom pole for the writer;

wherein the second GMR reader includes a GMR sensor sandwiched between a GMR sensor bottom shield and a GMR sensor top shield, wherein an insulating gap layer separates the GMR sensor bottom shield of the second GMR reader from the top pole of the writer.

17. The magnetic head of claim 16 wherein:

the shared shield includes a main body portion and a pedestal portion, wherein the main body portion serves as a GMR sensor top shield for the GMR sensor of the first GMR reader;

wherein the write gap layer is on the pedestal portion, wherein the pedestal portion serves as a bottom pole for the writer.

* * * * *